United States Patent [19]

Ahlstone

[11] 4,153,278
[45] May 8, 1979

[54] HYDRAULICALLY OPERATED MISALIGNMENT CONNECTOR

[75] Inventor: Arthur G. Ahlstone, Ventura, Calif.

[73] Assignee: Vetco, Inc., Ventura, Calif.

[21] Appl. No.: 834,683

[22] Filed: Sep. 19, 1977

[51] Int. Cl.² .................................. F16L 27/06
[52] U.S. Cl. .................... 285/18; 285/167;
285/263; 285/315; 285/320; 285/DIG. 21
[58] Field of Search .............. 285/18, 334.2, 263,
285/267, 167, 379, 315, 320, DIG. 21

[56] References Cited

U.S. PATENT DOCUMENTS

| | | | |
|---|---|---|---|
| 918,144 | 4/1909 | Greenlaw | 285/263 |
| 1,561,033 | 11/1925 | Spencer | 285/167 |
| 3,321,217 | 5/1967 | Ahlstone | 285/334.2 X |
| 3,332,709 | 7/1967 | Kowalski | 285/379 X |
| 3,492,027 | 1/1970 | Herring | 285/18 |
| 3,628,812 | 12/1971 | Larralde | 285/334.2 X |
| 3,848,899 | 11/1974 | Smith | 285/263 X |
| 4,068,868 | 1/1978 | Ohrt | 285/223 X |

FOREIGN PATENT DOCUMENTS

1164213  9/1969  United Kingdom ............ 285/263

*Primary Examiner*—Thomas F. Callaghan
*Attorney, Agent, or Firm*—Subkow and Kriegel

[57] ABSTRACT

A misalignment connector for large pipelines, conductor pipes or the like, includes an internal, metal seal ring having an external spherical periphery which is axially and circumferentially loaded between opposed internal spherical surfaces of connector structures which are operable by hydraulic piston and cylinder means to be interconnected over a range of angular misalignment. The internal sealing ring is preloaded when the connector parts are secured together. Initially, the internal sealing ring is supported in or nearly in engagement with one of the companion spherical surfaces of the connector parts for proper engagement and angular motion upon the interconnection of the connector parts over the permissible angular range of misalignment. The connector is made up by the application of fluid pressure to the actuator cylinder and piston means after the connector parts have been stabbed together. Radially shiftable locking elements are wedged towards one another by the action of the actuator cylinders. In some forms, the locking elements themselves have spherical surfaces engageable with a spherical surface of a connector hub. In another form, the locking member acts against a ring to urge the ring by camming means therebetween to force a spherical surface of the locking ring into engagement with the spherical surface of the hub.

41 Claims, 11 Drawing Figures

HYDRAULICALLY OPERATED MISALIGNMENT CONNECTOR

The offshore gas and oil industry has been, and is, more generally adopting the practice of utilizing large subsea pipelines for gathering and transporting production from wells completed on the floor of the sea at substantial depths. A pipeline may be damaged and require repair in such a subsea environment. In other situations, there is a need for a remotely operable misalignment connector, particularly in the case of making up connections between subsea pipes or other components which are disposed vertically.

Typically, the existing subsea misalignment connectors either utilize resilient elastomeric seals in combination with a structure enabling the misaligned interconnection of the connector parts, such as, for example, a spherical ball and socket connector. On the other hand, various subsea connectors have heretofore been provided for use in connecting blowout preventer stacks on subsea well heads and for interconnecting subsurface completion apparatus either to the blowout preventer stack or to the well head equipment, but such connectors have not had misalignment capability. Examples of the prior art misalignment connectors are illustrated in the following U.S. Pat. Nos.:

Harwell, Jr. 3,450,421 June 17, 1969
Hanes 3,695,633 Oct. 3, 1972
Arnold 3,874,706 Apr. 1, 1975
Arnold 3,944,263 Mar. 16, 1976.

An Example of remotely operable well head type connectors that have no misalignment capability are shown in U.S. Pat. No. 3,321,217, issued to me May 23, 1967. Another such connector is the collet latch connector of Cameron Iron Works, of Houston, Texas shown in COMPOSITE CATALOG OF OILFIELD EQUIPMENT AND SERVICES, Vol. 1, pg. 1420, 1976-1977, Gulf Publishing Company, Houston, Texas. (See also U.S. Pat. Nos. 3,096,999 and 3,658,366.)

Subsea or offshore pipeline operations involve the need from time to time, to make underwater connections which are very expensive and time consuming.

While most of the subsea operations are taking place in water shallow enough to enable the use of divers for the purpose of making up and breaking connections, the drilling of wells in water depths in excess of 2500 feet, as is taking place in some instances, prevents the utilization of divers because of the extreme pressure. While diving bells with manipulative tools could be employed in some circumstances, the connection must be of reasonably simple construction enabling relatively simple connection and disconnection. Thus, there is a continuing need for a remotely, hydraulically operated misalignment connector with sealing capacity necessary for safe and reliable connections to handle gas and oil production at great subsea depths.

In my pending application for United States Patent, Ser. No. 823,919, filed Aug. 12, 1977, there is disclosed a misalignment connector utilizing a ring seal which is initially supported in position adjacent to one of the connector parts for proper engagement with an adjacent connector part when the connector is being made up, the ring seal having an external spherical surface and the connector parts having companion internal spherical surfaces enabling the connector to be made up over a range of angular misalignment.

An object of the present invention is to provide a subsea connector of the general type disclosed in my above-identified pending application, but having the capability of remote operation.

In accomplishing the foregoing, the present invention provides a connector body assembly having fluid pressure operated piston and cylinder means and locking means operable by the piston and cylinder means, the body structure being adapted to be stabbed over the end of a companion connector structure, with the internal ring seal supported by the body structure for proper coengagement between the companion internal spherical surfaces provided by the body structure and the complemental connector structure, so that upon actuation of the piston and cylinder means the connector is automatically locked together in alignment or misaligned over a permissible range of angular misalignment.

The invention is embodied in two illustrative forms wherein the locking elements comprise pivotal locking dogs or collets carried by the body structure and held in an open condition providing a downwardly and outwardly flaring receptacle for receiving a companion connector part, when the connection is being stabbed together, the pivotal dogs being inwardly contracted to grip against a spherical surface of the connector structure in response to actuation of the actuator cylinder and piston means. In another form, the invention contemplates the provision of normally expanded locking dogs which enable the stabbing of the connector together, the dogs being thereafter wedged inwardly into interlocking and axial camming relationship with a sleeve carried by the connector part providing a spherical surface engaged with the connector part and enabling it to assume a range of angular misalignment with respect to the body structure.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings.

As seen in the drawings, a pipe connector C comprises a first connector or body structure 1 and a second connector structure 2 adapted to be stabbed together and interlocked against separation over a range of angles of misalignment, as will be hereinafter more particularly described.

As seen in FIGS. 1 through 4, the connector body structure 1 is adapted to be supported and moved into engagement with the connector structure 2 by means of a length of pipe or conduit 3 connected by a circumferentially continuous weld 4 to a tubular connector body sleeve or hub section 5, at the lower end of which is an enlarged belled hub end section 6. The hub section 5 is supported for angular movement with respect to the outer body 7 within a downwardly and inwardly inclined or tapered circumferentially continuous central opening 8 within the body structure 7. Provided on or threadedly connected to the hub section 5 by a threaded connection 9 is an outwardly and downwardly projecting flange 10 providing an upper spherical surface 11 and a lower spherical surface 12, the flange extending into a correspondingly shaped circumferentially extended groove 13, formed in the outer body section 7 and having a downwardly facing upper spherical surface 14 and an upwardly facing lower spherical surface 16 which are complemental to the respective upper and lower spherical surfaces 11 and 12 of the flange 10. The flange 10 has an outer peripheral end surface 17 opposed by a base wall 18 in the groove 13 which can limit the maximum extent of angular motion of the hub 5 within the central opening 8 of the body structure.

As illustrated, the outer body section 7 is a two-piece construction comprising a pair of complemental body members 19 and 20, secured together at a horizontal or transverse meeting plane 21 as by means of a suitable number of circumferentially spaced screw fasteners 22 engaged in threaded bores 23 in the body part 20.

Carried by the outer body section 7 are actuator means 24 for axially shifting a wedge ring 25, which is carried by the actuator means 24 and which is adapted to cause actuation of a plurality of circumferentially spaced locking collets or dogs 26, when the connection is being made up, as will be later described. Initially, however, the locking dogs 26 are held in a captured condition between the wedge ring 25 and the exterior of the tubular hub section 5, by means of the enlarged belled hub end 6, whereby the entire connector body structure, consisting of the hub 5, the body 7, the actuator means 24, and the wedge ring 25, together with the locking dogs or collets 26 can be manipulated or run into coengagement with the connector part 2, on the conductor or pipe 3.

Figure 1:
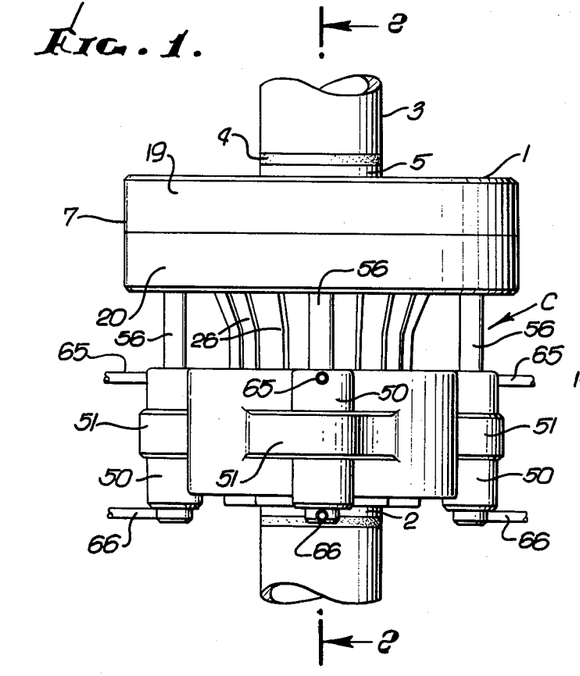
FIG. 1 is a view in elevation illustrating one form of the misalignment connector hereof.
Figure 2:
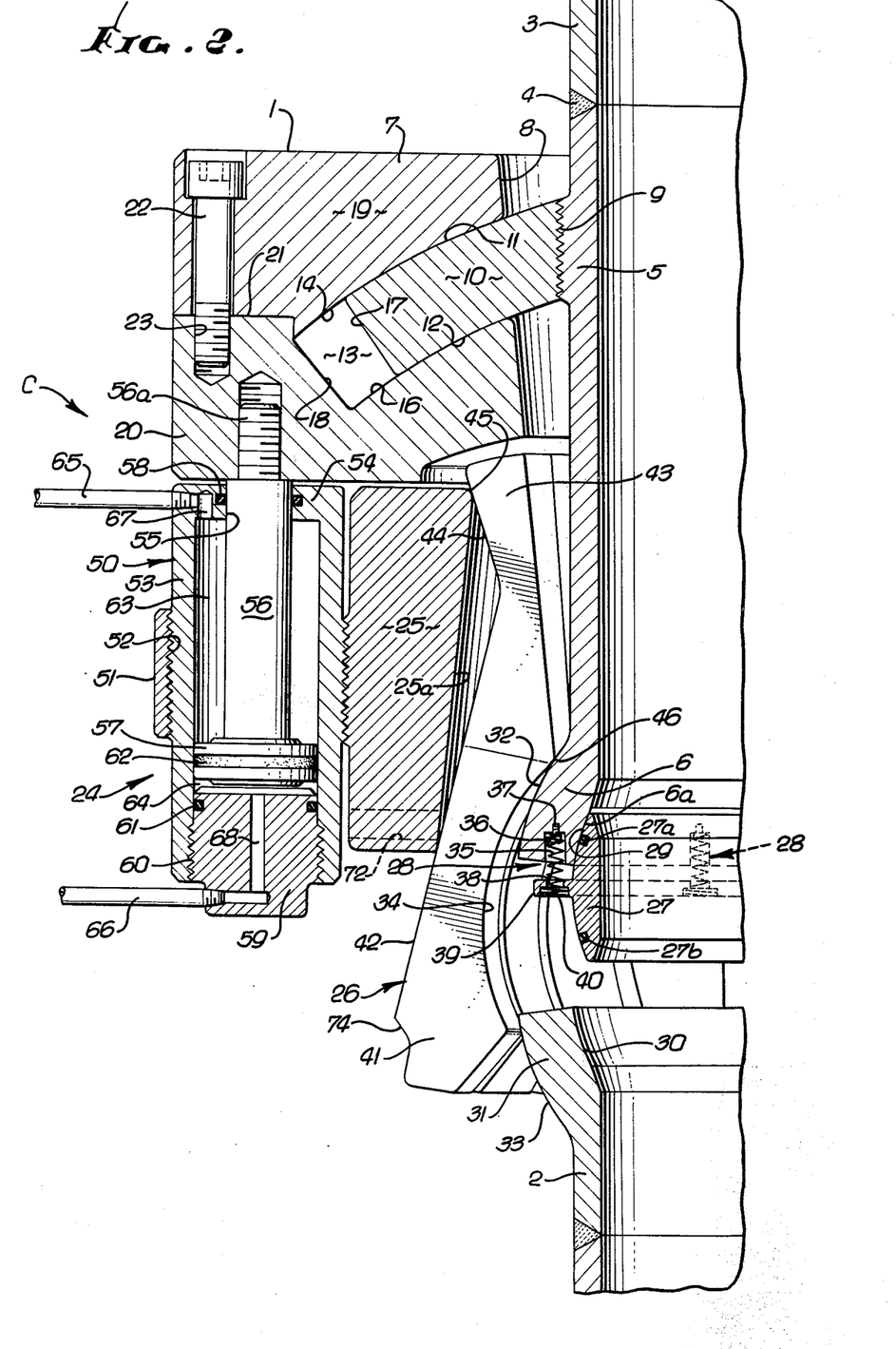
FIG. 2 is an enlarged fragmentary quarter section, as taken on the line 2—2 of FIG. 1, showing the connector being stabbed together.

Referring to FIG. 2, it will be noted that the hub end 6 supports a metal seal ring 27 by support means 28 initially holding the seal ring in a position with respect to the hub end 6, with the inner spherical surface 6a of the hub end in or nearly in engagement with the outer spherical surface 29 of the seal ring 27, the seal ring 27 being held for proper coengagement within an internal spherical surface 30 provided within an enlarged hub end 31 of the lower connector part 2. In the embodiment now being described, the hub ends 6 and 31 provide symetrical hub configurations, each having an external spherical surface 32 on the hub end 6 and 33 on the hub end 31, adapted to be engaged by an internal spherical surface 34 provided within the respective locking dogs or collets 26, as will be later described.

The supporting means 28 for the internal seal ring 27 may be of a desired configuration, for example, as illustrated and described in my prior pending application, Ser. No. 823,919, identified above. In the illustrative form, the retainer means 28 comprises a plurality of circumferentially spaced coiled springs 35 having one end disposed in a bore 36 in the end of the hub section 6 and secured in place by a suitable fastener 37. The other end of the coiled spring 35 extends through an opening 38 in an outwardly projecting support flange 39 on the outer periphery of the seal ring 27, and has enlarged coils 40 engaging in the base of a spring seat, whereby the tension of the springs 35 can initially hold the seal ring 27 in the position shown in FIG. 2.

The respective locking dogs or collet members 26 each comprises an elongated body section 41 having the above described internal spherical surface 34 and also having an external surface 42 extending at an angle longitudinally of the body section 41, for wedging engagement by an internal downwardly and outwardly inclined wedging surface 25a provided within the ring 25. Adjacent their upper ends, the locking dogs or collets 26 have end sections 43 provided with external surfaces 44 which extend downwardly and inwardly at an angle, and provide camming surfaces engageable by the upper inner end surface 45 of the actuator ring 25, when it is desired to release the connector, as will be later described. Internally of each finger, and spaced above the internal spherical surface 34 therein, is a fulcrum point 46, whereby the locking dogs or collet fingers 26 are adapted to be pivoted on the outer surface of the enlarged upper hub end 6, between the open collet or dog position of FIG. 2 and the closed collet or dog position of FIG. 3. Such pivoting of the collets or dogs 26 is responsive to operation of the actuator means 24.

The actuator means 24 are adapted to effect longitudinal movement of the wedge ring 25. In the illustrative form, the actuator means comprises a suitable number of actuator cylinder and piston units 50 spaced circumferentially about the locking ring 25. As shown, the locking ring has a number of circumferentially spaced outstanding ears 51 provided with threaded bores 52, into which are threaded the elongated cylinders 53 of the units 50. Each cylinder 53 has an upper head 54 provided with an opening 55, through which the rod 56 of a piston 57 reciprocably extends. A suitable side ring seal 58 is provided between the head 54 and the piston rod 56. At its upper end the rod 56 has a threaded connection 56a with the upper body section 7, whereby the cylinder and piston units 50 are connected to the upper body. At the lower end, each cylinder 53 has a removable head 59 threadedly engaged as at 60 into the threaded lower end of the cylinder 53 and having a side ring seal 61 engageable within the cylinder. The piston 57 has a piston ring 62, dividing the cylinder into upper and lower piston chambers 63 and 64 to which hydraulic fluid is adapted to be supplied and exhausted through conduits 65 and 66 connected to the respective cylinder heads and communicating with end ports 67 and 68. Pressure fluid is adapted to be either supplied or exhausted by the respective conduits 65 and 66, as is customary in double acting piston and cylinder units, under control of suitable valve means (not shown).

When the connector body structure 1, with the inner hub section 5 supported thereby, and with the collet or locking dogs 26 in the retracted positions of FIG. 2, are lowered onto or stabbed upon the lower hub 31, the internal seal ring 27 is automatically guided into position within the internal spherical surface 30 of the hub 31 over a range of permissible angular misalignment. Thereafter, the connector can be actuated to the condition of FIG. 3, by the application of pressure fluid through the conduit 66 beneath the actuator piston 57 of the respective actuator units 50, fluid being exhausted through the conduit 65 of each unit. It will be understood without requiring illustration that these conduits 65 and 66 can be connected to respective supply and exhaust lines leading upwardly through a body of water to a vessel or platform where suitable control and pressure means are provided.

Figure 3:
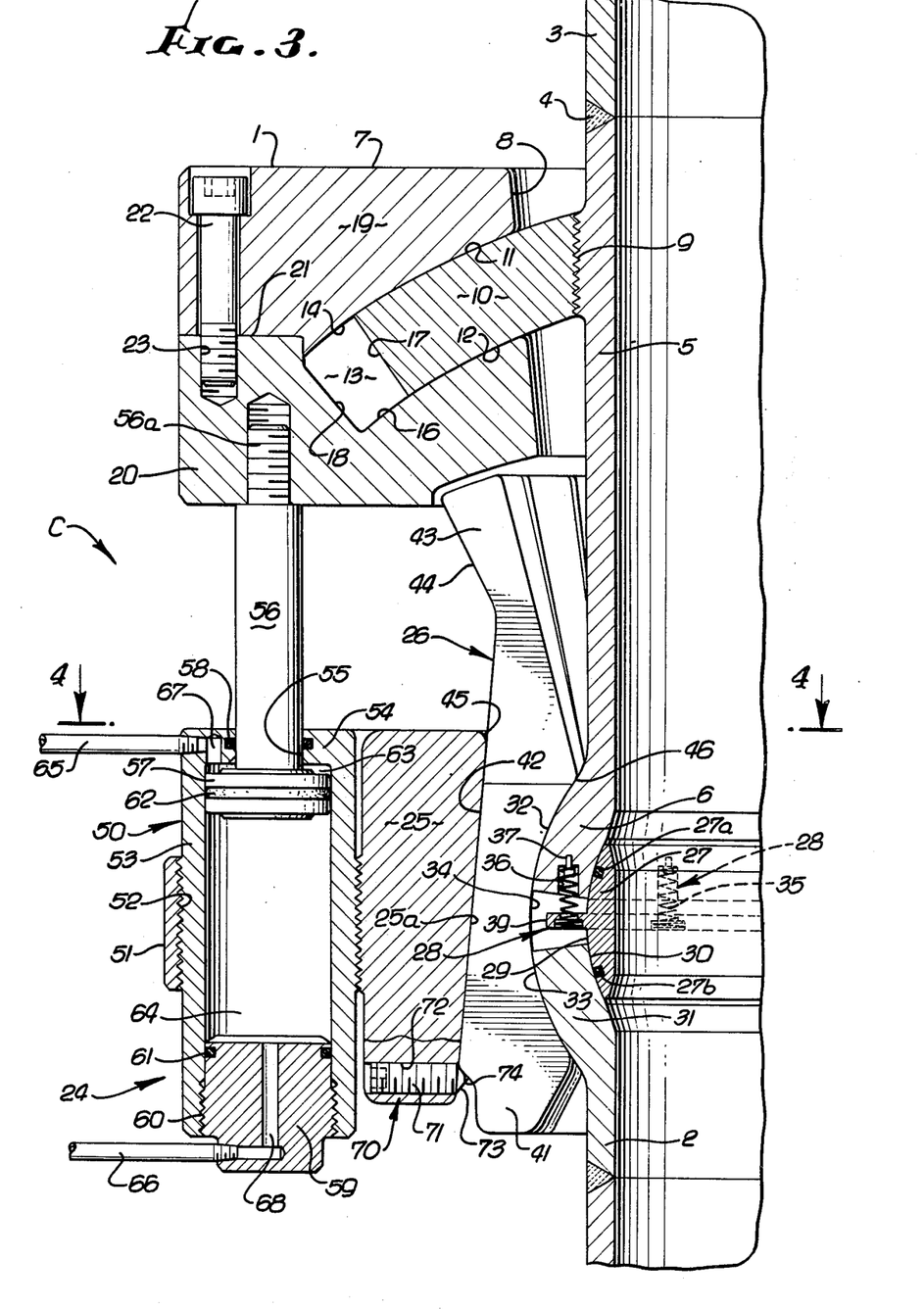
FIG. 3 is a view corresponding to FIG. 2 but showing the connector made up and locked.
Figure 4:
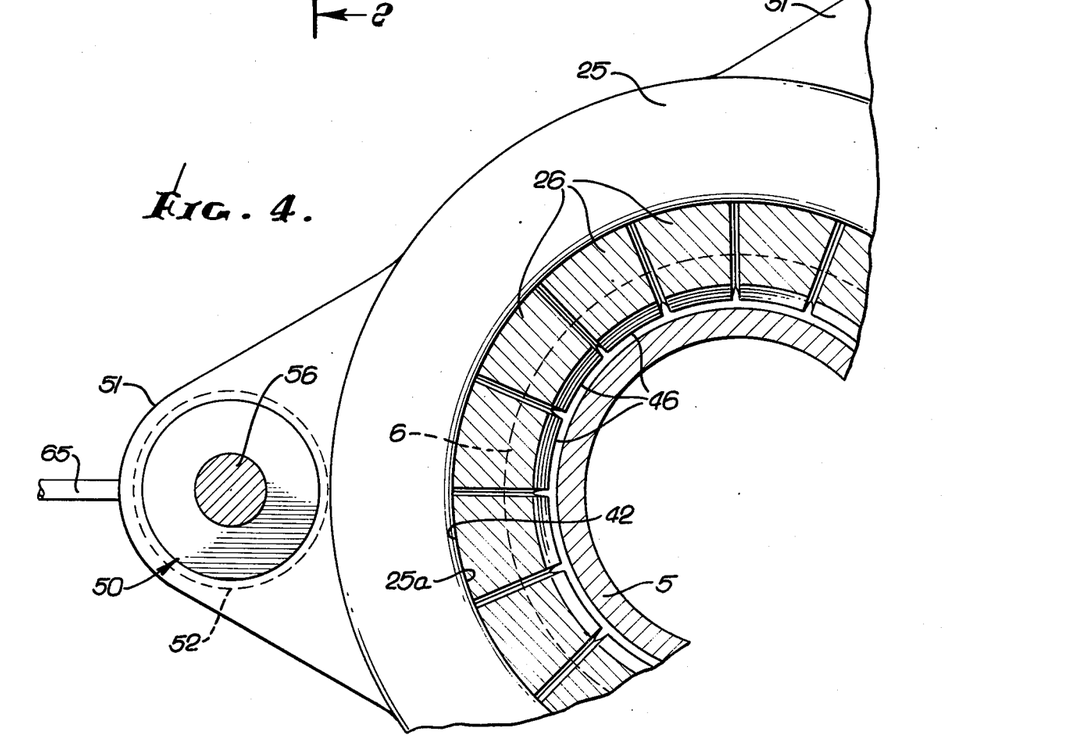
FIG. 4 is a fragmentary transverse section, as taken on the line 4—4 of FIG. 3.

As seen in FIG. 3, downward movement of the lock ring 25 effects a wedge action upon the outer wedge surfaces 42 of the respective locking dogs or collets 26, causing them to pivot about their points 46, bringing the internal spherical surfaces 34 of the respective dogs into pressure loaded contact with the external spherical surfaces 32 and 33 of the respective connector hub ends 6 and 31. As the locking collets or dogs are closed upon the hub ends, there is also an axial force component applied to the respective hubs by the camming action of the confronting spherical surfaces as they are moved into tightly fitting coengagement, whereby the internal spherical surfaces 28 and 30 of the respective hub ends are axially loaded into coengagement with the external spherical surface 29 of the internal seal ring 27, whereby the latter is in a prestressed or loaded condition, in sealing engagement within the hubs, and the seal ring can then withstand the internal fluid pressure within the connector, during use. In addition to the metal to metal sealing contact between the seal ring 27 and the respective hub ends, the sealing ring 27 also carries within its outer spherical surface a pair of circumferentially extended elastomeric seal rings 27a and 27b which engage within the spherical hub surfaces 28 and 30 and back up the metal to metal sealing contact.

While the connector C as seen in FIG. 3 is shown in a condition of alignment, it will be recognized that when the connector is made up, the respective spherical hub ends 6 and 31 can be angularly misaligned to an extent necessary, each hub being capable of accomodating one-half of the total angle of misalignment. Angular misalignment of the connector hub 2 with respect to the body structure, is limited by engagement of the end surface of the hub section 31 with the spring supporting flange 39 on the outer periphery of the seal ring 27, which will cause the seal ring to be angularly shifted until the support flange 39 is engaged between the confronting ends of the pair of hub sections 6 and 31. Total angular misalignment of the connector, as previously indicated, can be limited by coengagement between the opposing surfaces 17 and 18 provided on the spherical flange 10 and within the flange receiving groove 13 of the upper body structure.

If it is desired to remotely release the connector C, it is only necessary to apply actuator fluid pressure through the conduit 65, above the actuator piston 57, in the chamber 63, to again shift the cylinder upwardly with respect to the piston, to the upper position of FIG. 2, at which time the locking collets or dogs 26 will again be released. Inadvertent release of the connector can be prevented by suitable means, such as best seen in FIG. 3. In this illustrative embodiment, the locking ring 25 has means 70 to prevent upward movement of the cam or locking ring 25 with respect to the collets or dogs 26. This means 70 is shown as comprising a suitable number of circumferentially spaced screws 71 threaded into complementally threaded bores 72 adjacent the lower periphery of the cam ring 25 and having inner conical noses 73 adapted for locking coengagement with an outwardly facing, downwardly and inwardly inclined locking surface 74 provided adjacent the lower end of the respective locking dogs or collets.

Figure 5:
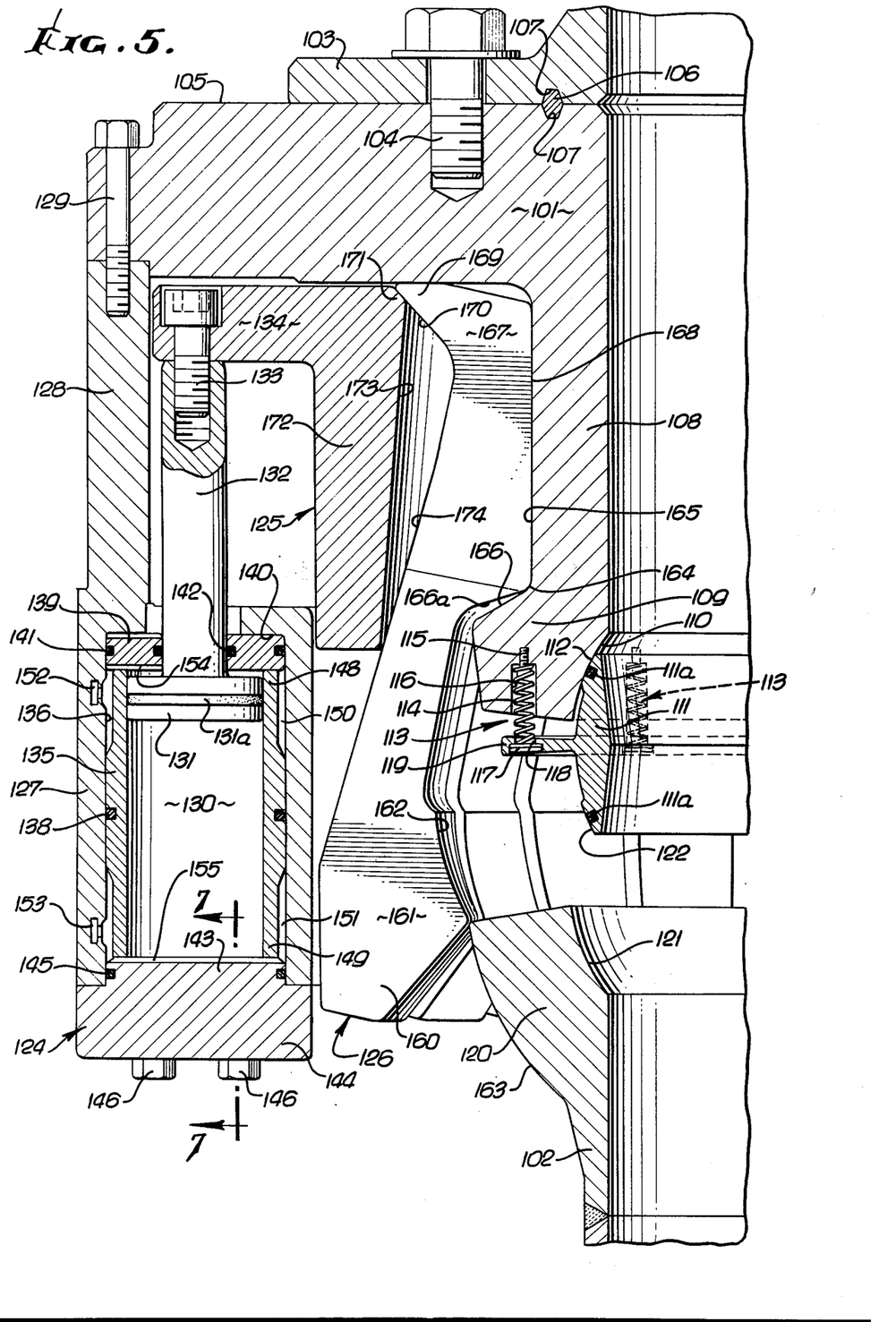
FIG. 5 is a view corresponding to FIG. 2, but illustrating another form of the connector construction being stabbed together.
Figure 6:
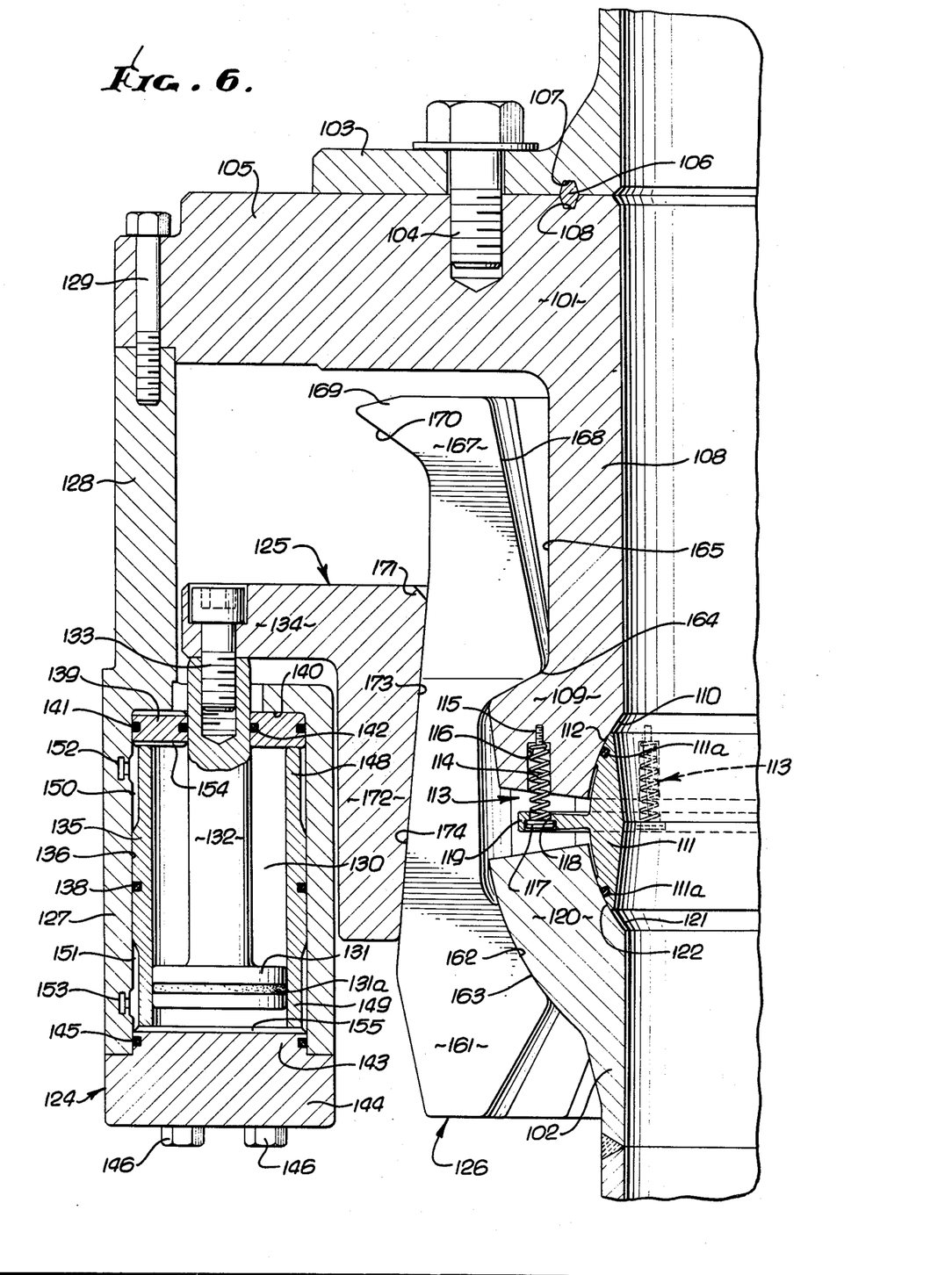
FIG. 6 is a view corresponding to FIG. 5, but showing the connector made up and locked.
Figure 7:
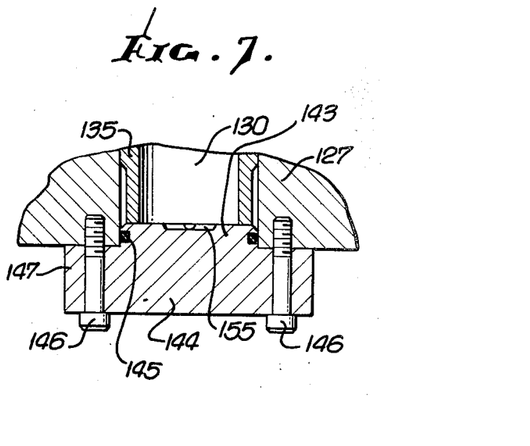
FIG. 7 is a fragmentary section as taken on the line 7—7 of FIG. 5.

Referring to FIGS. 5 through 7, another form of connector is illustrated which is adapted to be stabbed together over a range of angular misalignment and hydraulically locked and released under the control of pressure fluid supplied from a remote location.

In this form, the connector includes an upper body structure 101 and a lower connector structure 102 providing the interengageable connector parts. The body structure 101, instead of being connected to a pipe as in the case of the previously described form, is connected to a connector flange 103 by a suitable number of circumferentially spaced fastenings 104 threaded into the body structure and clamping the flange 103 against the upper surface of the upper body flange 105, with a suitable metal seal ring 106 disposed therebetween in opposed downwardly and upwardly facing divergent grooves 107. The flange 103 may be part of any desired tubular structure on which the connector body structure 101 can be manipulated and moved into cooperative engagement with the connector structure 102.

Extending downwardly from the body flange 105 is a tubular section 108 having at its lower end an enlarged hub 109, which provides internally a circumferentially extended spherical surface 110. Adjacent to the spherical surface 110, the hub end 109 supports an internal metal seal ring 111, with an external spherical surface 112 of the ring disposed in or nearly in engagement with the spherical surface 110 of the hub. Here again, the supporting means 113 comprises a coiled spring 114 having an inner end convolution secured by a fastener 115 in the base of a bore 116 in the hub 109, and an outer convolution 117 which extends through an opening 118 in a ring supporting flange 119, so as to engage in the spring seat provided in the flange 119. A plurality of such resilient supporting means 113 are disposed in circumferentially spaced relation, as in the case of the previously described embodiment, whereby to shiftably support the seal ring 111 with respect to the flange hub 109, for proper sealing and loading coengagement between the hub 109 and the companion hub 120 provided on the lower connector structure 102. Within the lower hub 120 is a circumferentially extended spherical surface 121 adapted to sealingly coengage with the spherical seating surface 122 provided on the sealing ring 111, when the connector is made up.

Actuator means 124 are provided for shifting cam or wedge means 125 relative to locking dog or collet means 126 which are laterally shiftable between the open or retracted positions of FIG. 5 and the closed positions of FIG. 6 to lock the connector hubs 109 and 120 together.

The actuator means 124 comprises an annular body 127 supported beneath the upper body flange 105 by a circumferentially extended tubular body section 128 which is suitably secured beneath the upper body flange 105 by a number of circumferentially spaced screw fasteners 129. The body 127 has fluid pressure operated piston and cylinder means disposed in circumferentially spaced locations about the body section, one of which is illustrated in FIG. 5 and FIG. 6, as comprising a cylinder or piston chamber 130 in which is reciprocable a piston 131, having a piston rod 132 extending upwardly therefrom and connected as by a screw fastener 133 to an upper end flange 134 of the wedge or cam means 125. The chamber 130 is formed by an inner cylinder sleeve 135 disposed within a bore 136 in the body 127 and having a suitable side ring seal 138 for preventing the bypass of fluid about the exterior of the cylinder sleeve. At the top of the cylinder sleeve is a cylinder head member 139 engaged beneath a downwardly facing shoulder 140 of the body and sealingly engaged within the bore 136, by a suitable means such as side ring seal 141, the cylinder head 139 also having an internal side ring seal 142 sealingly and slidably engaging the piston rod 132. The cylinder sleeve 135 abuts at its upper end with the cylinder head 139 to hold the latter in position, and at its lower end the cylinder sleeve 135 is engaged by the upper surface of the cylindrical section 143 of a closure plate or member 144 having a side ring seal 145 engaged in the bore 136. The retainer is secured in place as seen in FIG. 7 by suitable fasteners 146 extending through oppositely extended ears 147 and into the cylinder body 127.

The cylinder sleeve 135 has reduced end portions 148 and 149 forming annular spaces 150 and 151 respectively at the upper and lower ends of the body bore 136. Pressure fluid conducting ports 152 and 153 communicate with the respective upper and lower chamber 150 and 151, and the cylinder head 139 is radially slotted at 154 to provide communication between the upper chamber 150 and the piston chamber 130 above the piston 131. The lower chamber 151 communicates with the piston chamber 130 below the piston 131 through a slot 155. A suitable side ring or piston ring seal 131a carried by the actuator piston 131 is slidably and sealingly engaged within the cylindrical wall of the chamber 130 and prevents communication between the upper and lower chamber portions. Hydraulic fluid can be supplied to the piston chamber above or below the piston 131, selectively, through the respective ports 152 and 153, which can alternate as pressure inlet and exhaust ports. The locking means 126 in this embodiment comprises a plurality of circumferentially spaced locking collets or dogs 160 disposed in circumferentially spaced relation about the connector body section 108. These collet members or dogs 160 have retractible and inwardly shiftable lower end sections 161 provided with an internal spherical surface 162 companion to the spherical surface 163 on the exterior of the hub end 120 of the connector part 102. Between its ends, each of the dogs or collets 160 has an internal fulcrum point 164 about which the collets are able to pivot between the open positions of FIG. 5 and the closed positions of FIG. 6, the fulcrum point 164 engaging in the region of the juncture of the external cylindrical wall 165 of the body section 108 and a downwardly and outwardly inclined upwardly facing annular shoulder 166 formed on the hub end 109 of the body section 108. Extending upwardly from the fulcrum point 164, the respective collets or dogs 161 have lever arms 167 having internal surfaces 168 adapted to engage the cylindrical wall 165 of the body section 108 when the collets are in the outwardly retracted condition of FIG. 5. Retraction of the collets is effected by an outwardly projecting upper end portion 169 on the collet levers having a downwardly and inwardly inclined surface 170 engageable by the upper inner corner 171 of the wedge means 125, when the wedge means is shifted upwardly from the position of FIG. 6 to the position of FIG. 5, to release the connector.

The wedge means 125 has a downwardly projecting cylindrical portion 172 having a downwardly and outwardly inclined or tapered internal wedge surface 173, adapted, upon downward movement of the wedge means, from the position of FIG. 5 towards the position of FIG. 6, to engage external surfaces 174 of the respective collet members 161 which are inclined downwardly and outwardly and cooperate with the internal wedge surface 173 of the wedge body 172, to move the collet members from the outwardly retracted positions to the closed positions loaded against the respective connector hubs 109 and 120. The hubs are axially loaded towards one another between the downwardly and outwardly inclined inner surfaces 166a of the collet members which engage the surface 166 on the hub 109, and the internal spherical surfaces 162 on the collet members which engage the external spherical surface 163 on the hub 120. As the hubs are loaded towards one another, over the range of angular misalignment of the connector parts, the internal seal ring 111 is loaded between the internal spherical surfaces 110 and 121 on the respective hubs 109 and 120 to effect a tight metal to metal seal between the just mentioned spherical surfaces on the hubs and external spherical surface of the sealing ring. This metal to metal seal is backed up by an elastomeric seal provided by a pair of circumferentially extended elastomeric seal rings 111a carried in grooves formed about the outer periphery of the sealing ring 111, so that the connector is capable of sealing against internal pressure acting outwardly about the interior of the sealing ring 111.

From the foregoing, it will now be apparent upon reference to FIGS. 2 and 5, that in each of these forms of the remotely operable misalignment connector, the locking dog or collet means 26 and 126, when in the open or retracted condition flare downwardly and outwardly and form essentially an inverted funnel shape which facilitates stabbing of the connector body structures onto the respective hubs 2 and 102 of the lower connector part. In the form of FIGS. 1 through 4, the symmetrical form of the respective hubs 6 and 31 enables a portion of the angular misalignment to be accomodated by each of the hubs, thereby maintaining a relatively small sealing diameter. In the form of FIGS. 5 through 7, however, the total angular misalignment is accomodated by the spherical fit between the sealing ring and the lower hub 120, so that the sealing diameter is somewhat larger. In each case, however, the connector can be easily made up at remote locations and in hostile environments such as a relatively deep subsea environment, either in a vertical or horizontal condition or at any range of angularity between vertical and horizontal.

Referring to FIGS. 8 through 11, another form misalignment connector is shown wherein the connector body structure can be stabbed over a companion connector part over a range of angles of misalignment, and the connector can be remotely actuated to lock the connector body structure and companion connector part together.

Figure 9:
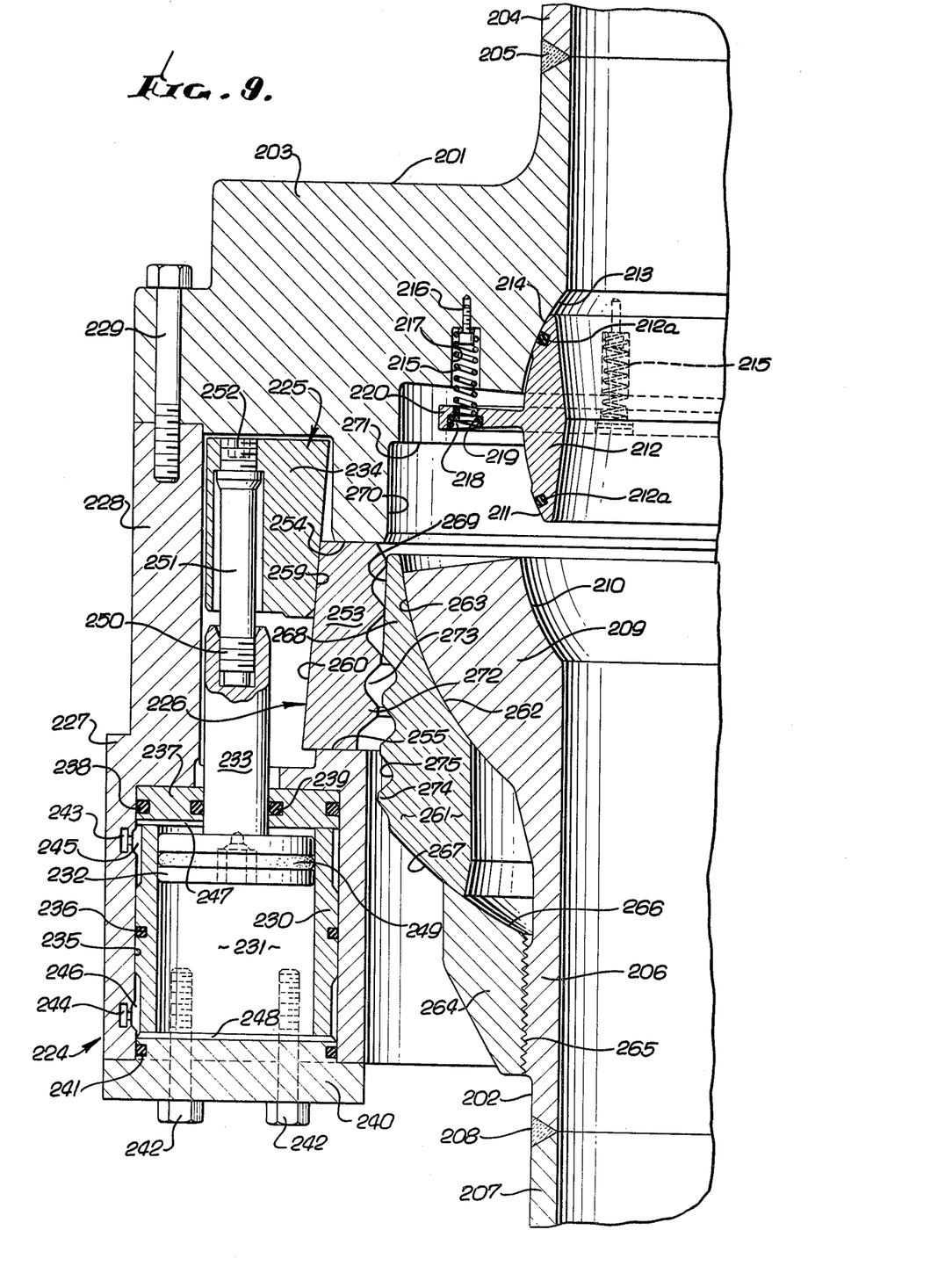
FIG. 9 is an enlarged fragmentary quarter section as taken on the line 9—9 of FIG. 8, showing the connector being stabbed together.

In this form, the body structure 201 of the connector C comprises a body flange 203 connected to a length of pipe 204 by a circumferentially continuous weld 205, and the connector part 202 adapted to be engaged within and connected to the body structure, comprises a tubular hub member 206 connected to a downwardly extending pipe 207 by a circumferentially continuous weld 208. The connector part 202 has at its upper or free end, an enlarged hub 209 providing an internal circumferentially extended spherical surface 210, adapted to sealingly engage an external spherical surface 211 on the metal seal ring 212 which is initially supported, as shown in FIG. 9, for a range of angular adjustment with respect to the internal spherical surface 213 provided within the body flange 203, for sealing engagement with the external spherical surface 214 on the seal ring 212. Here again, the illustrative means for initially supporting the seal ring 212 in a position with respect to the body structure for proper coengagement with the connector part 202 when the connector is stabbed together, comprises a coiled spring 215 having an inner coil secured by a fastener 216 to the flange 203 within a bore 217, with an outer enlarged coil 218 of the spring engaging in a seat 219 provided by a supporting flange 220 which projects outwardly from the outer periphery of the seal ring 212. It will be understood, as previously described, that a plurality of the resilient spring supports are provided in circumferentially spaced relation about the body structure so as to support the seal ring 212, when the body structure is in a vertical disposition or any other non-vertical disposition, to facilitate making up the connector.

The body structure 201, in this form, comprises actuator means 224 for actuating wedge means 225 to effect locking coengagement of locking means 226 with the structure of the connector part 202.

The actuator means 224 comprises an annular body section 227 supported beneath the body flange 203 on a cylindrical body secton 228 which is connected to the flange by means of a suitable number of circumferentially spaced screw fasteners 229. In the annular body section 227 is a suitable number of circumferentially spaced piston and cylinder actuators comprising a cylinder 230 providing a piston chamber 231 in which a piston 232 is reciprocable, the piston 232 having a rod 233 connected to a wedge ring 234 of the wedge means 225. The cylinder member 230 is disposed within a bore 235 in the body section 227 and has an external side ring seal 236 for preventing the bypass of pressure fluid about the cylinder. At the upper end of the bore 235 is an upper cylinder head member 237 having an external side ring seal 238 engaged within the bore 235 and an internal side ring seal 239 slidably and sealingly engaged with the piston rod 233. At the lower end of the cylinder 230 is a lower cylinder head and retainer plug 240 having a side ring seal 241 engaged within the bore 230, the head member 240 being secured to the body section 227 by suitable fastenings 242, as in the case of the lower heads 144 of the embodiment shown in FIGS. 5 through 7. Actuating pressure fluid is adapted to be supplied to the piston chamber 231 and exhausted therefrom above and below the piston 232 by a passage means in the body structure shown as passages 243 and 244 respectively communicating with annular spaces 245 and 246 defined between the exterior of the cylinder sleeve 230 and the wall of the bore 235. These spaces 245 and 246 respectively communicate with the piston chamber 231 through appropriate radial slot or slots 247 in the upper head 237 and 248 in the lower head 240, and the piston 232 has a side ring seal or piston ring 249 which prevents leakage around the piston. As is well known in connection with double acting actuator cylinders, the ports 243 and 244 can alternately function as inlet or exhaust ports. If desired, however, the actuator cylinder means of the present invention can be constructed in accordance with my prior patent No. 3,321,217, wherein primary and secondary actuator cylinders are employed to assure release of the connector.

The actuator piston rod 233 has a threaded connection 250 with a connecting rod 251 which is threaded into the wedge ring 234 at 252, whereby reciprocation of the piston will effect axial movement of the wedge ring 234.

Figure 10:
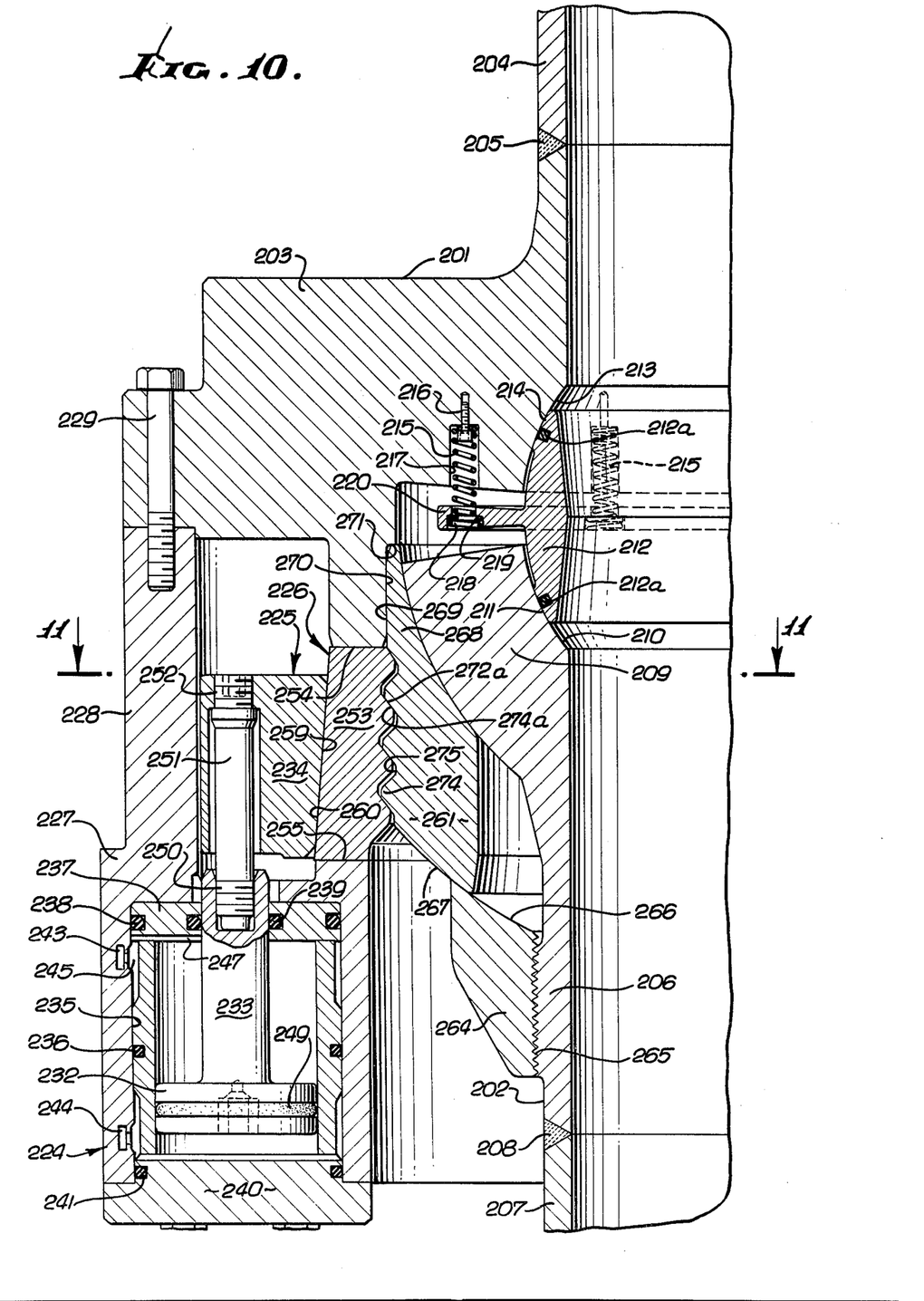
FIG. 10 is a view corresponding to FIG. 9, but showing the connector made up and locked.

Such axial movement of the wedge ring is adapted to cause inward movement of the locking means 226 with respect to the connector structure 202 from the retracted position shown in FIG. 9 to the inwardly projected position shown in FIG. 10.

Figures 8, 11:
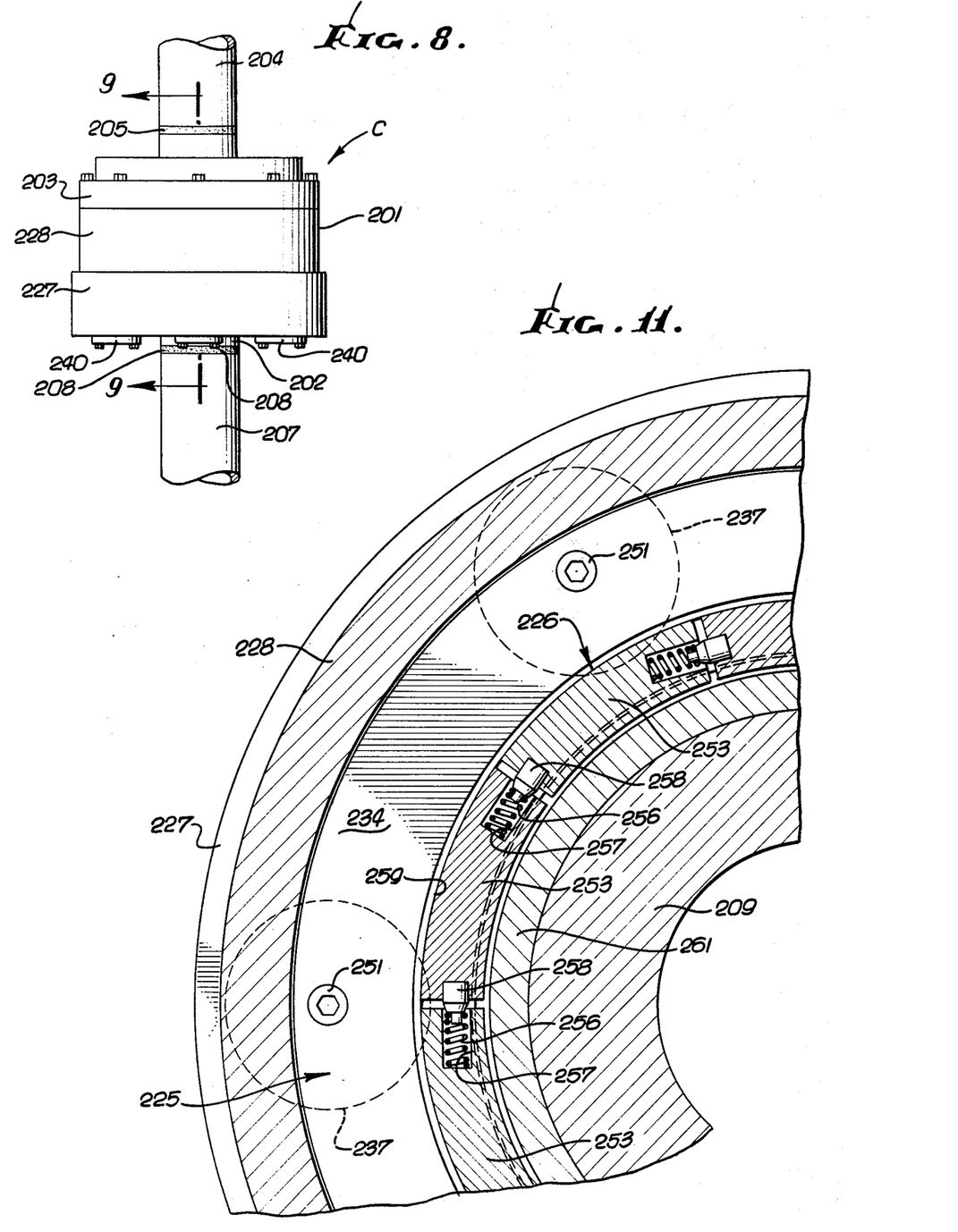
FIG. 8 is a side elevation showing another form of connector in accordance with the invention.
FIG. 11 is a transverse section as taken on the line 11—11 of FIG. 10.

The locking means 226 comprises a plurality of arcuate locking dog segments 253 shiftably disposed in a circumferentially extended window in the body structure between a downwardly facing upper shoulder 254 provided by the top flange 203 and a lower upwardly facing shoulder 255 provided on the annular body member 227. As seen in FIG. 11, the dog segments 253 are normally spring loaded away from one another and therefore relatively outwardly by suitable springs 256 disposed in bores 257 in one side of the dog segments and engaging a spring seating member 258 carried at the other side of the respective dogs, so that the dog segments can ge wedged inwardly by the wedge ring 234 upon actuation of the actuator means 224. In this connection, it will be seen that the wedge ring 234 has an internal surface 259 which is inclined downwardly and outwardly and is adapted to engage external downwardly and outwardly inclined outer surfaces 260 on the locking dog segments 253.

The connector structure 202 is adapted to be engaged by the locking dog segments 253 and interlocked to the body structure 201 over a range of angular misalignment. Accordingly, in the form shown, a locking ring 261 is disposed about the hub 209 and has an internal spherical surface 262 cooperatively engageable with an external spherical surface 263 on the enlarged hug section 209. The locking ring 261 is retained in place upon the hub by means of a retainer ring or collar 264 threaded at 265 onto the exterior of the hub section 206, after application of the lock ring 261, and before welding the hub member 206 to the conduit 207. The stop ring or collar 264 has an upwardly facing internal spherical surface 266 engageable with a downwardly facing spherical surface 267 on the lock ring 261, whereby the hub structure can be moved angularly with respect to the locking ring 261. The locking ring 261 has an upwardly extended end section 268 providing an external cylindrical surface 269, adapted to be stabbed into a cylindrical bore 270 within the body flange 203, as shown in FIG. 10, and to shoulder at its upper end with a downwardly facing shoulder 271 at the top of the bore 270, when the connector is stabbed together. The interior of the locking dog segments 253 and the exterior of the locking ring 261 are formed to cooperatively interlock the connector parts together and apply an axial loading force to the connector hug 209 through the action of the locking ring 261. More particularly, the interior of the locking dogs provide vertically spaced and circumferentially extended ribs 272 and grooves 273, with the crests of the ribs being of gradually diminishing diameter from bottom to top. The exterior of the locking ring 261 has companion ribs 274 and grooves 273, with the crests of the ribs also gradually diminishing in diameter from bottom to top. When the connector parts are initially stabbed together, with the wedge ring 234 in the upper position of FIG. 9, the locking ring 261 can pass axially between the locking dog segments 253, until the upper end section 268 of the ring is disposed in the body bore 270. Thereafter, in response to the application of pressure fluid to the actuator cylinder chamber 231 above the respective pistons 232, the wedge ring 234 is moved downwardly, wedging the locking dog segments 253 inwardly, causing the upper flanks 272a of the ribs 272 on the dog segments to engage the lower flanks 274a of the ribs 274 on the lock ring 261, whereby to apply an axial camming action to the locking ring 261, forcing its internal spherical surface 262 into engagement with the external spherical surface 263 of the connector hub 209, thereby loading the latter axially.

Accordingly, the locking ring 261, upon stabbing the connector parts together is aligned with the axis of the body structure, regardless of the angular disposition of the lower connector structure 202, as permitted by the spherical seat, provided between the hub 209 and the retainer ring 264. The hub 209 is loaded axially by the locking ring 261 to effect tight coengagement between the internal spherical surface 210 in the hub structure 209 and 213 in the body structure with the external spherical surfaces 211 and 214 of the internal sealing ring 212, which is preloaded to maintain tight metal to metal sealing contact. In addition, the outer spherical surface of the sealing ring 212 is provided with elastomeric backup sealing means in the form of circumferentially extended elastomeric seal rings 212a in the respective spherical surfaces 21 and 214 thereof, to assure that the seal ring can effect a fluid tight seal confining fluid pressure within the fluid passage provided through the connector.

When the actuator means 224 are pressurized to shift the wedge ring 234 upwardly from the position of FIG. 10 to the position of FIG. 9, the locking dog segments 253 are again retractible to enable the connector to be disconnected.

From the foregoing it will now be apparent that the present invention provides a remotely operable misalignment connector which has advantageous application, particularly to the making up of subsea connections between pipelines or other fluid conducting components, wherein misalignment may be encountered, and wherein the internal metallic sealing ring means is capable of angular adjustment with respect to its initial support, to enable the connector to be made up over a range of angles of misalignment in a simple and relatively easy manner, and the connector can maintain an effective seal by reason of the utilization of the internal metal sealing ring with its elastomeric backup seal, to assure the maintenance of sealing integrity over a wide range of pressures, for which the connector is designed.

I claim:

1. In a misalignment connector: a body structure having a fluid opening and a first spherical sealing surface circumscribing said opening; a connector hub having a fluid opening and a second spherical sealing surface circumscribing said opening; an internal metal seal ring having an external spherical surface engaged with said first and second spherical sealing surfaces, with said seal ring circumferentially loaded therebetween; wedge means shiftable with respect to said connector hub; expansible and inwardly shiftable locking means operable by said wedge means for holding said body structure and said connector hub against separation; and remotely operable actuator means for shifting said wedge means between positions inwardly shifting said locking means and allowing expansion of said locking means; said locking means providing a spherical surface, said connector hub having an external spherical surface engaged by said spherical surface of said locking means and said connector hub being spaced from said body structure enabling misalignment of said connector hub and said body structure.

2. In a misalignment connector as defined in claim 1; said actuator means comprising fluid pressure operated piston and cylinder means disposed between said body and said wedge means.

3. In a misalignment connector as defined in claim 1; said actuator means comprising a cylinder means in said body and piston means in said cylinder means and connected to said wedge means, and means providing inlet and outlet ports for said cylinder means.

4. In a misalignment connector as defined in claim 1; said locking means comprising a plurality of dog members spaced circumferentially in said body, said wedge means comprising a wedge ring disposed about said dog members, said wedge ring and said dog members having wedge surfaces for moving said dog members inwardly upon movement of said wedge ring by said actuator means in one direction.

5. In a misalignment connector as defined in claim 1; said body structure including another hub having said first spherical surface therein and another external spherical surface, said locking means having a further spherical surface engaged with said another spherical surface.

6. In a misalignment connector as defined in claim 1; said body structure including another hub having said first spherical surface therein and another external spherical surface, said locking means having a further spherical surface engaged with said another spherical surface, and including means supporting said another hub in said body structure for angular movement.

7. In a misalignment connector as defined in claim 1; said body structure including another hub having said first spherical surface therein and another external spherical surface, said locking means having a further spherical surface engaged with said another spherical surface, and including means providing additional spherical surfaces mounting said another hub in said body structure for relative angular movement.

8. In a misalignment connector as defined in claim 1; said body structure including another hub having said first spherical surface thereon, said locking means and said another hub having coengaged surfaces urging said hubs towards one another.

9. In a misalignment connector as defined in claim 1; said locking means including a locking member carried by said connector hub and having said spherical surface of said locking means thereon, and means mounting said locking member on said connector hub for relative angular movement.

10. In a misalignment connector as defined in claim 1; said locking means including a locking member carried by said connector hub and having said spherical surface of said locking means thereon, and means mounting said locking member on said connector hub for relative angular movement, including a stop member on said connector hub, said stop member and said locking member having further spherical surfaces coengaged and enabling angular movement between said hub and said locking member.

11. In a misalignment connector as defined in claim 1; said locking means including a locking member carried by said connector hub and having said spherical surface of said locking means thereon, and means mounting said locking member on said connector hub for relative angular movement, said locking means also including dogs carried by said body and shiftable by said wedge means into engagement with said locking member.

12. In a misalignment connector as defined in claim 1; said locking means including a locking member carried by said connector hub and having said spherical surface of said locking means thereon, and means mounting said locking member on said connector hub for relative angular movement, said locking means also including dogs carried by said body and shiftable by said wedge means into engagement with said locking member, said locking member and said dogs having means coengaged to urge said locking member and said connector hub towards said seal ring upon engagement of said dogs with said locking member.

13. In a misalignment connector as defined in claim 1; said body structure and said seal ring having means shiftably supporting said seal ring adjacent to said first spherical surface for angular movement of said seal ring upon coengagement of said external spherical surface of said seal ring between said first and second spherical surfaces.

14. In a misalignment connector as defined in claim 1; said seal ring having elastomeric sealing means engaged with said first and second spherical surfaces.

15. In a misalignment connector as defined in claim 1; said body structure and said seal ring having means shiftably supporting said seal ring adjacent to said first spherical surface for angular movement of said seal ring upon coengagement of said external spherical surface of said seal ring between said first and second spherical surfaces, said seal ring having elastomeric sealing means engaged with said first and second spherical surfaces.

16. In a misalignment connector as defined in claim 1; said actuator means comprising fluid pressure operated piston and cylinder means disposed between said body and said wedge means.

17. In a misalignment connector as defined in claim 1; said locking means comprising a plurality of dog members spaced circumferentially in said body, said wedge means comprising a wedge ring disposed about said dog members, said wedge ring and said dog member having wedge surfaces for moving said dog members inwardly upon movement of said wedge ring by said actuator means in one direction, said actuator means including piston and cylinder means connected between said wedge ring and said body structure.

18. In a misalignment connector as defined in claim 17; means for expanding said dog members upon movement of said wedge ring in the other direction.

19. In a misalignment connector as defined in claim 17; means for expanding said dog members upon movement of said wedge ring in the other direction, including retractor portions on said dogs engageable by said wedge ring.

20. In a misalignment connector as defined in claim 17; means for expanding said dog members upon movement of said wedge ring in the other direction, including wedge surfaces on said dog members and said connector hub.

21. In a misalignment connector: a body structure having a fluid opening and a first spherical sealing surface circumscribing said opening; a connector hub having a fluid opening and a second spherical sealing surface circumscribing said opening; an internal metal seal ring having an external spherical surface engaged with said first and second spherical surfaces, with said seal ring circumferentially loaded therebetween; locking means carried by said body structure including locking dog members circumferentially spaced about and pivotal on said body structure and having end portions inwardly shiftable towards said connector hub; said dogs and said connector hub and body structure having coengaged locking surfaces holding said first and second spherical surface engaged with said seal ring upon inward movement of said end portions; and means for actuating said dogs pivotally into locking engagement of said locking surfaces of said connector hub and body structure, said locking surfaces of said dogs and said connector hub being spherical.

22. In a misalignment connector as defined in claim 21; said means for actuating said dogs including a wedge ring disposed about said dogs, and means for shifting said wedge ring relative to said dogs.

23. In a misalignment connector as defined in claim 21; said means for actuating said dogs including a wedge ring disposed about said dogs, and means for shifting said wedge ring relative to said dogs, including double acting fluid pressure operated actuator cylinder and piston means.

24. In a misalignment connector as defined in claim 21; said body structure including another hub having said first spherical surface therein; means mounting said another hub for angular movement in said body structure.

25. In a misalignment connector as defined in claim 21; said body structure including another hub having said first spherical surface therein; means mounting said another hub for angular movement in said body structure; said locking surfaces on said dogs and said body structure also being spherical.

26. In a misalignment connector as defined in claim 24; said means mounting said another hub comprising a spherical projection on said another hub engaged in a spherical seat in said body structure.

27. In a misalignment connector as defined in claim 21; said body structure having another hub rigid therewith and having said first spherical surface therein.

28. In a misalignment connector as defined in claim 21; said body structure and said seal ring having means shiftably supporting said seal ring adjacent to said first spherical surface for angular movement of said seal ring upon coengagement of said external spherical surface of said seal ring between said first and second spherical surfaces.

29. In a misalignment connector as defined in claim 21; said seal ring having elastomeric sealing means engaged with said first and second spherical surfaces.

30. In a misalignment connector as defined in claim 21; said body structure and said seal ring having means shiftably supporting said seal ring adjacent to said first spherical surface for angular movement of said seal ring upon coengagement of said external spherical surface of said seal ring between said first and second spherical surfaces, said seal ring having elastomeric sealing means engaged with said first and second spherical surfaces.

31. In a misalignment connector: a body structure having a fluid opening and a first spherical sealing surface circumscribing said opening; a connector hub having a fluid opening and a second spherical sealing surface circumscribing said opening; an internal metal seal ring having an external spherical surface engaged with said first and second spherical surfaces, with said seal ring circumferentially loaded therebetween; said connector hub having a locking ring mounted thereon for angular movement; locking dogs spaced circumferentially in said body and supported for inward movement and outward movement relative to said locking rings; said locking ring and said dogs having coengaged locking elements holding said connector hub in said body structure responsive to inward movement of said dogs; and means for actuating said dogs; said connector hub having an external spherical surface; said locking ring having an internal spherical surface engaged with the spherical surface of said connector hub.

32. In a misalignment connector as defined in claim 31; said means for actuating said dogs including a wedge ring disposed about said dogs, and means for shifting said wedge ring relative to said dogs.

33. In a misalignment connector as defined in claim 31; said means for actuating said dogs including a wedge ring disposed about said dogs, and means for shifting said wedge ring relative to said dogs, including double acting fluid pressure operated actuator cylinder and piston means.

34. In a misalignment connector as defined in claim 31; said coengaged locking elements being axially spaced circumferentially extended ribs and grooves on said dogs and on said locking ring.

35. In a misalignment connector as defined in claim 31; and including means retaining said locking ring on said connector hub.

36. In a misalignment connector as defined in claim 21; and including means retaining said locking ring on said connector hub, including a retainer ring, said retainer ring and said locking ring also having coengaged spherical surfaces.

37. In a misalignment connector as defined in claim 31; said body structure and said seal ring having means shiftably supporting said seal ring adjacent to said first spherical surface for angular movement of said seal ring upon coengagement of said external spherical surface of said seal ring between said first and second spherical surfaces.

38. In a misalignment connector as defined in claim 31, said seal ring having elastomeric sealing means engaged with said first and second spherical surfaces.

39. In a misalignment connector as defined in claim 31; said body structure and said seal ring having means shiftably supporting said seal ring adjacent to said first spherical surface for angular movement of said seal ring upon coengagement of said external spherical surface of said seal ring between said first and second spherical surfaces, said seal ring having elastomeric sealing means engaged with said first and second spherical surfaces.

40. In a misalignment connector: a body structure having a fluid opening and a first spherical sealing surface circumscribing said opening; a connector hub having a fluid opening and a second spherical sealing surface circumscribing said opening; an internal metal seal ring having an external spherical surface engaged with said first and second spherical sealing surfaces, with said seal ring circumferentially loaded therebetween; expansible and inwardly shiftable locking means operable for holding said body structure and said connector hub against separation; and remotely operable actuator means for inwardly shifting said locking means and for allowing expansion of said locking means; said locking means and said connector hub having coengaged spherical surfaces permitting angular misalignment of said body structure and said connector hub.

41. In a misalignment connector as defined in claim 40, said acutator means comprising fluid pressure operated piston and cylinder means disposed between said body and locking means.

* * * * *